Dec. 3, 1957 D. C. MADDUX 2,814,998
DISPENSING MACHINE
Filed Nov. 5, 1954 5 Sheets-Sheet 1

INVENTOR.
DUANE C. MADDUX
BY
Lynn W. Latta
—ATTORNEY—

Dec. 3, 1957 D. C. MADDUX 2,814,998
DISPENSING MACHINE

Filed Nov. 5, 1954 5 Sheets-Sheet 3

INVENTOR.
DUANE C. MADDUX
BY
Lynn H. Latta
—ATTORNEY—

Dec. 3, 1957     D. C. MADDUX     2,814,998
DISPENSING MACHINE
Filed Nov. 5, 1954     5 Sheets-Sheet 4

INVENTOR.
DUANE C. MADDUX
BY
—ATTORNEY—

Dec. 3, 1957  D. C. MADDUX  2,814,998
DISPENSING MACHINE
Filed Nov. 5, 1954  5 Sheets-Sheet 5

INVENTOR.
DUANE C. MADDUX
BY
Lynn W. Latta
—ATTORNEY—

United States Patent Office 2,814,998
Patented Dec. 3, 1957

2,814,998

DISPENSING MACHINE

Duane C. Maddux, Burbank, Calif.

Application November 5, 1954, Serial No. 467,089

19 Claims. (Cl. 107—21)

This invention relates to machines for dispensing frozen confections such as ice creams and sherbets. The general object of the invention is to provide an improved dispensing machine of the type utilizing a confined rotating and axially advancing movement of a carton supporting turn-table for feeding a body of frozen confection against a knife which slices therefrom, a ribbon of material which is dispensed from the machine for serving purposes.

OBJECTS OF INVENTION

A particular object of the present invention is to provide an improved machine of this type having means for severing the ribbon, as it is delivered from the slicing knife, into serving portions of uniform shape. A further object is to provide such a machine adapted to dispense serving portions of a shape particularly adaptable for application to ice cream cones and likewise adaptable for serving in dishes. Another object is to provide such a machine having means for regulating the size of the serving portion through a range of sizes to be vended at different prices, and for different purposes. For example, the invention particularly makes it possible to dispense a small portion for insertion into an ice cream cone, or a larger portion for dish serving.

One of the problems in a dispensing machine for dispensing frozen confections from a carton, is that of disposal of the carton. The present invention contemplates a machine of a type having means for trimming away the lateral wall of the carton along a helical path, in the form of a ribbon having a width corresponding to the depth of cut of the slicing knife in the body of the confection. A particular object of the present invention is to make provision for disposing of this ribbon of carton material without the necessity for having the ribbon pile up in a tangled mass outside the machine. To this end, the present invention contemplates the provision of means for chopping the ribbon into short lengths, together with a receptacle in the top of the machine, for receiving and storing these lengths of ribbon material until such time as they are removed to a waste container. In this connection, we have found that the problem of chopping the ribbon of waxed cardboard material into short lengths has embodied a number of difficulties, not the least of which is the toughness of the material and the difficulty of obtaining a sharp clean shearing action.

A further object is to provide a machine of the character described, in which the above mentioned means for severing the slice of confection material into serving portions, and the means for chopping the ribbon of carton material into short lengths, are cooperatively arranged for actuation by a common power actuating means, in order to achieve simplicity as far as possible.

The invention further relates to the improvement of means for trimming off the carton as it is fed toward the cream slicing knife. This mechanism likewise has been beset with a number of difficulties. For instance, a carton trimmer, such as a power driven rotatable disc cutter must, when in operative trimming position, intersect the wall of the carton. However, when a new carton is being placed in the machine, the presence of the trimming disc in a position intersecting the cylindrical area to be occupied by the carton, interferes with the insertion of the carton into the machine. Consequently, in the present improvement, the trimming disc is mounted for retraction radially outwardly to a sufficient extent to clear the cylindrical space to be occupied by the carton, and after the carton is installed it is moved back into engagement with the carton wall. The provision for such radial shifting of the trimming disc, however, raises another problem, namely that of maintaining the trimming disc in intersecting relation to the carton wall during operation of the machine. In this respect the invention provides an arrangement in which the drag forces which are set up by the resistance of the carton wall to the cutting action, are applied to the trimming disc in a manner to urge it inwardly into cutting position.

A further object of the invention is to provide a machine of the type indicated, wherein a common source of power is utilized for driving the feed turntable, the carton trimmer, and the ice cream cut-off and carton ribbon severing devices.

A further object of the invention is to provide a frozen confection dispensing machine of compact construction and proportions such that it can be inserted into a cell of a conventional cooler cabinet of the type used in ice cream parlors etc., for keeping cartons of ice cream in a refrigerated condition, for dispensing to customers.

Other objects will become apparent in the ensuing specification and appended drawings in which.

GENERAL DESCRIPTION OF MACHINE

Our improved dispensing machine, in general, comprises a number of units which are designated by capital letters, as follows: the housing A, having a removable cover A', encloses most of the mechanism. Cover A' constitutes the base for a removable head section of the machine, the removal of the head section making it possible to remove from the machine the remains of a used up carton, and to insert a fresh carton, full of frozen confection material, into the machine.

Figure 3:
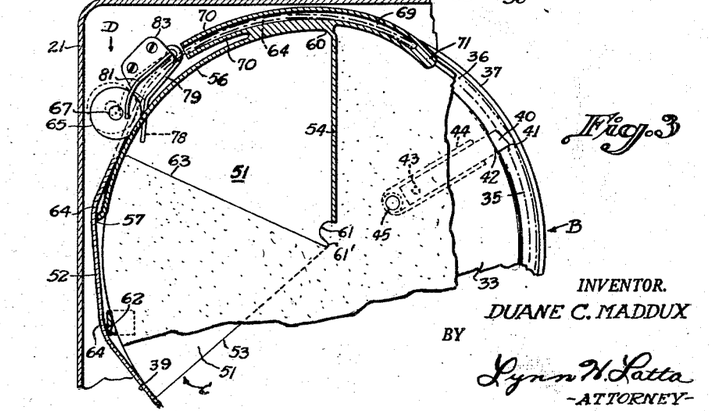
Fig. 3 is a horizontal fragmentary sectional view of the upper portion thereof taken on the line 3—3 of Fig. 2.
Figure 4:
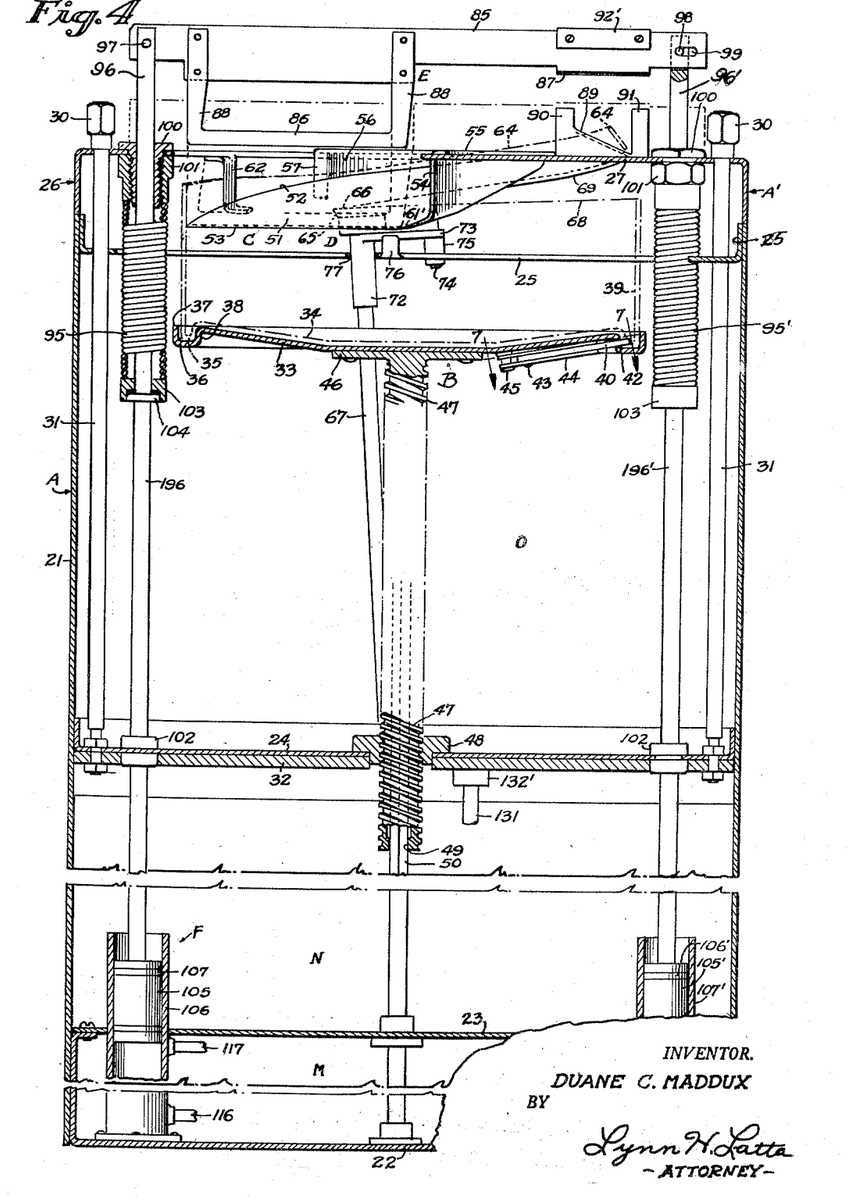
Fig. 4 is a vertical sectional view taken diagonally through center of the machine as indicated on the line 4—4 of Fig. 1.
Figure 5:
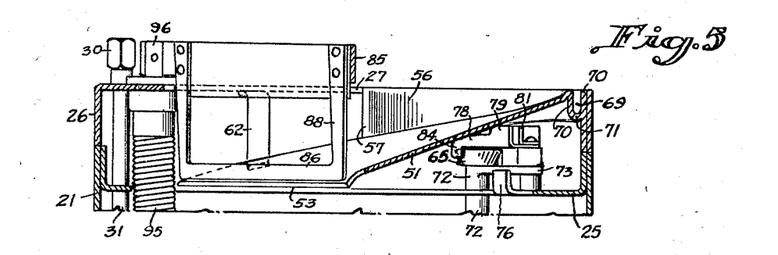
Fig. 5 is a vertical sectional view of the upper portion of the machine taken on the line 5—5 of Fig. 1.

The turntable B (Figs. 2, 3, 4, 7) supports a carton, shown in broken lines in Fig. 4, for rotating and gradually feeding the carton upwardly.

The slicing knife unit C (Figs. 2, 3, 4, 5, 8) engages the body of ice cream within the carton, along a radial line extending from a point adjacent the center of the body out through the inner peripheral wall of the carton. The rotation of turntable B is clockwise, as viewed from above, causing the body of frozen confection to be fed circumferentially against the cutting edge of knife unit C, whereby a slice of the frozen material having a width substantially equal to a radius of the carton, will be severed from the body and fed circumferentially over the cut-off knife.

The carton trimmer unit D (Figs. 3, 10, 11, 12) operates on the lateral wall of the carton at the same time the confection material is being sliced from the body within the carton.

The cut-off unit E (Figs. 1, 4, 8, 9) includes a knife, disposed radially, for severing the arcuate strip of confection material which is being sliced from the confection body by knife unit C, into sector shaped portions, along radial lines.

The cut-off unit E also includes a shearing blade, cooperable with an anvil on cover A', for chopping the severed ribbon of carton material into short lengths.

Actuator mechanism F (Figs. 4, 14, 15) includes a hydraulic servomotor operable, in response to the delivery of hydraulic fluid under pressure thereto from an electrically powered pump, to deliver a stroke of variable length to a swinging lever which in turn transmits movement through a train of gears to a drive shaft of turntable unit B and to the drive shaft of carton trimming unit D and also actuates a pair of vertically arranged hydraulic servomotors, for elevating and spring loading the cut-off unit E.

Control mechanism G (Fig. 15) includes a starting button for initially energizing the electric motor of actuator mechanism F, and a limit switch for terminating a cycle of operation thus initiated.

Setting mechanism H (Figs. 1, 14) provides for adjusting the position on the stroke of the main servomotor, where the fluid pressure is cut off, thus determining the length of stroke and the side of the dispensed portion of confection material. The release of fluid pressure allows the cut-off unit E to descend with a sharp chopping action under the stored up energy of spring loading.

I will now proceed with a detailed description of the various units of the machine.

A. *The housing structure.*—In describing the housing, reference is first made to Fig. 4.

Figure 6:
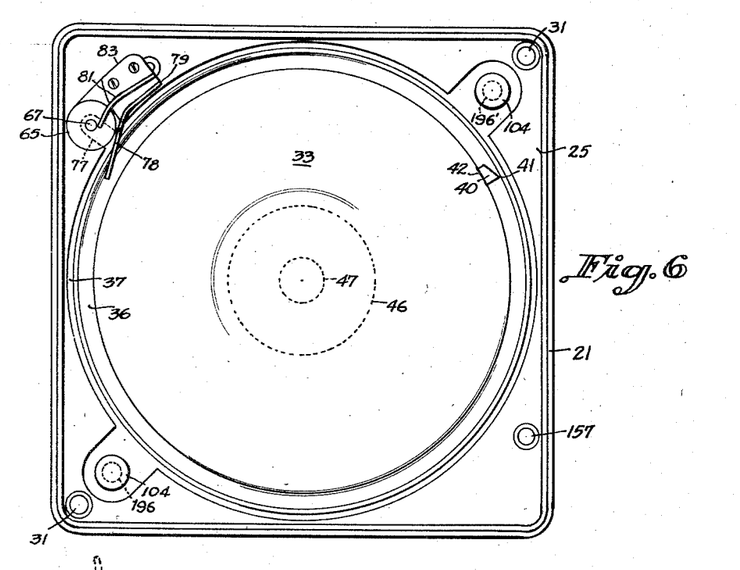
Fig. 6 is a plan view of the machine with the head section removed.
Figure 15:
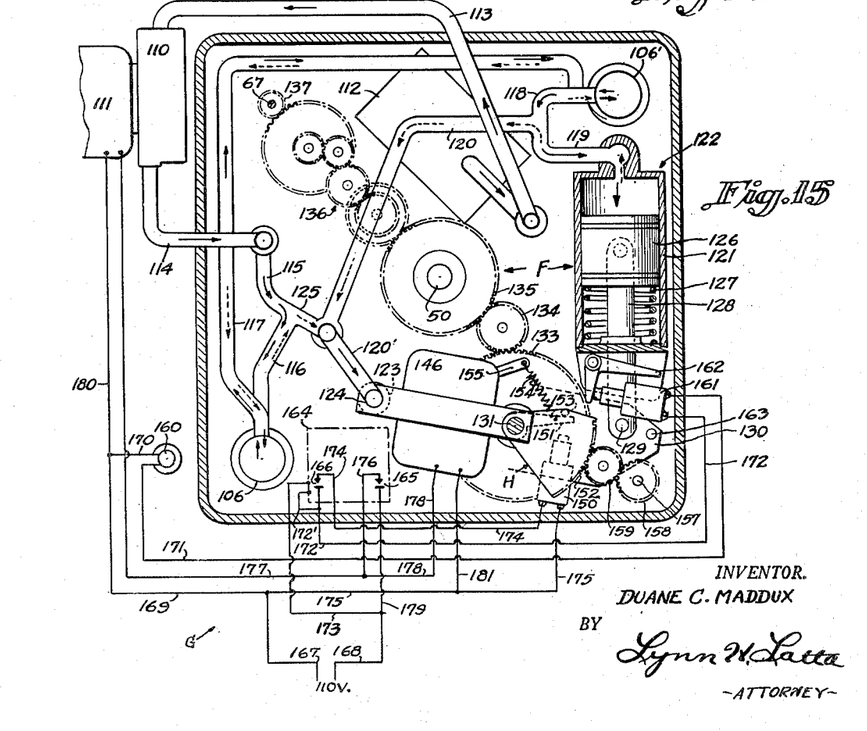
Fig. 15 is a schematic illustration of the power operating and control apparatus of the invention.

Housing A includes a tubular lateral wall section 21 of generally square cross section, as shown in Figs. 6 and 15. Secured within the lower portion thereof is a lubricant pan 22 which forms the bottom of the housing. Most of the actuator mechanism F and control mechanism G, including the power transmitting gearing, the main servomotor, and the pump, is enclosed within a chamber M defined between oil pan 22 and a horizontal pan cover 23, secured to the top of the pan. Defined between cover 23 and a horizontal partition 24, spaced above cover 23, is a chamber N in which additional parts of the actuator and setting mechanism are enclosed.

Secured within tubular lateral wall section 21, near the top thereof, is a spider 25 in the general form of a square ring fitted to the inner wall of tubular section 21. Between spider 25 and partition 24 there is defined the main central chamber O in which is accommodated the turntable B and a confection carton supported thereon. The depth of chamber O is sufficient to accommodate the height of a full carton.

Cover section A' has a peripheral flange 26 registering with the upper end of tubular lateral wall section 21, and includes a top panel 27.

Figure 1:
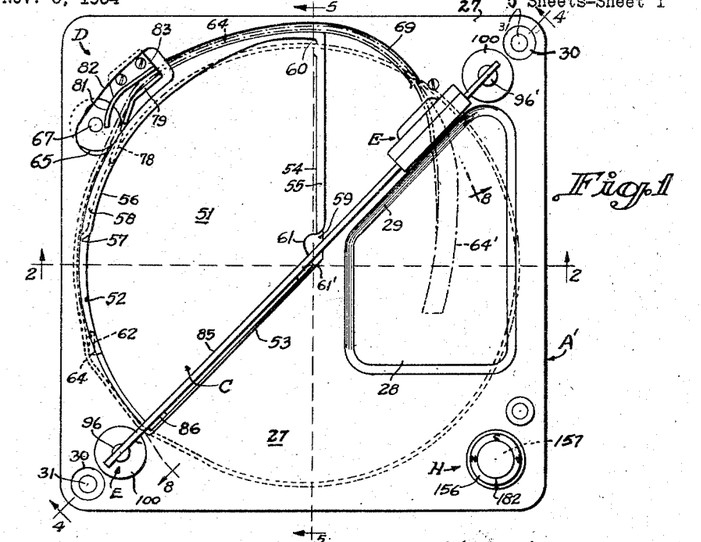
Fig. 1 is a plan view of a dispensing machine embodying our invention.
Figure 2:
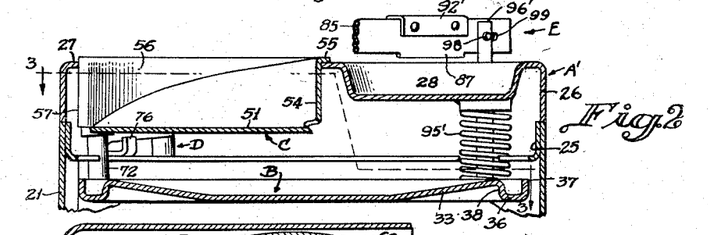
Fig. 2 is a vertical sectional view of the upper portion thereof taken on the line 2—2 of Fig. 1.

Referring now to Figs. 1 and 2, top panel 27 is formed with a depressed portion which provides a receptacle 28 for the severed pieces of carton material that are chopped from the end of a ribbon fed upwardly from the carton trimmer unit D. Receptacle 28 occupies a space between the center of cover section A' and a side margin thereof, being generally in the form of a rectangular trapezoid having one side 29 disposed at a 45 degree angle, closely adjacent a diagonal axis between two opposite corners of the machine, along which diagonal axis the blade of the cut-off unit E also extends.

Cover section A' is held down against the upper end of lateral wall section 21, by means of clamp nuts 30 threaded on the upper ends of the tie rods 31, the latter extending downwardly through openings in spider 25 and having their lower ends threaded and extending through partition 24 and anchored in a reinforcing beam 32 which engages and supports the underside of partition 24, extending diagonally from corner to corner of the machine. Removal of nuts 30 permits the entire head of the machine, including housing cover section A', to be lifted away from the lateral wall section 21, thus opening the machine to permit insertion or removal of a carton. As will be pointed out more fully hereinafter, all operating parts, associated with cover section A', which might otherwise impede the insertion and removal of cartons, are carried by the cover section A' and are lifted off therewith.

Housing A, A' is of the proper proportion and shape to be received within a rectangular cell of an ice cream fountain cooler cabinet. The machine is sufficiently low in height so that, when resting on the bottom of the cabinet cell, its upper extremity is cleared by the cell cover, allowing the latter to be moved to a closed position without interference from the dispensing machine.

B. *The turntable unit.*—The unit B includes a turntable 33, which is of shallow dish form so as to conform generally to the usual downwardly bowed shape of the bottom 34 of a carton, whereby the latter may be securely supported by the turntable 33 with its marginal flange 35 securely resting in an upwardly opening annular channel 36 forming the rim of turntable 33. Channel 36 (Fig. 7) includes an outer vertical flange 37 and an inner vertical flange 38, the latter constituting an offset between the bottom of the channel and the periphery of the frustoconical portion of turntable 33. The flange 35 of the carton is adapted to be clamped against the turntable flange 37 by the clamp mechanism shown in Fig. 7.

Figure 7:
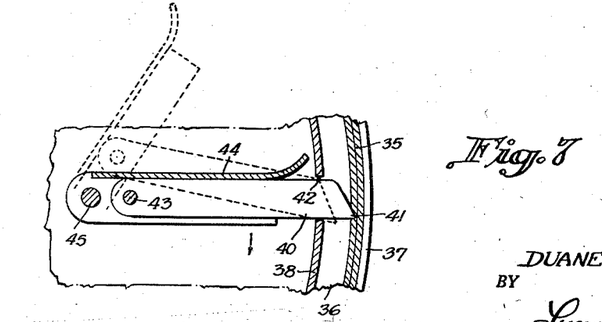
Fig. 7 is a detail sectional view of one of the carton clamps, taken on the line 7—7 of Fig. 4.

Referring now to Fig. 7, the carton clamping unit, of which there may be one, two, three or more, comprises a clamping dog 40 of straight bar shape having at its outer end an acute angle jaw 41 to engage the carton wall 39, the adjacent outer end portion of the dog being slidably extended through a slot 42 in flange member 38. The inner end of dog 40 is connected by a pivot 43 to an operating lever 44, adjacent a pivot 45 by means of which the lever 44 has its inner end pivoted to the lower side of turntable 33. Lever 44 is in the form of a thin flat channel having parallel side portions between which dog 40 is snugly embraced. The channel is open at one side to allow the lever to be opened up, jackknife fashion, from the closed position shown in full lines in Fig. 7 (in which jaw 41 is projected against carton wall 39) to the opened position shown in dotted lines in Fig. 7 (in which jaw 41 has been withdrawn from carton wall 39). In the closed position, the web portion of channel 44 is engaged against one side of dog 40 to lock the lever and dog against retracting movement. Thus the jaw 41 is securely locked in engagement with carton flange 35, clamping the latter tightly against turntable flange 37, and with the point of the jaw imbedded in carton flange 35 to prevent any slippage of the carton relative to the turntable. The turntable is driven in the clockwise direction as indicated by the arrow in Fig. 7, the jaw 41 being pointed in that direction so as to provide maximum drive transmission to the carton wall.

It will be apparent that with lever 44 pivoted at one end to the turntable and with the opposite end of dog 40 slidably mounted in slot 42, the dog 40 will be effectively guided for sliding movement.

The carton clamping device is easily actuated for clamping and releasing the carton, it being only necessary to reach beneath the turntable with the fingers, to grasp the free end of lever 44 and to swing it one direction or the other. The very secure clamping of the carton which is obtained through the toggle action of dog 40 and lever 44, is quite important, for the reason that with ice cream or sherbet in a desirable state of hardness for serving purposes, a considerable amount of torque must be exerted against the carton in order to effect the shaving operation by which the confection material is removed from the carton.

The central portion of turntable 33 is mounted upon and secured to a face plate 46 on the upper end of a screw shaft 47 which functions both to rotate the turntable and to advance it upwardly as it rotates. Screw shaft 47 has threads with a pitch corresponding to the depth of cut to be taken in the body of confection material in carton 34. For example, the pitch may be ¾ inch in order to provide for a ¾ inch cut.

Shaft 47 is threaded through a nut 48 which is securely mounted in partition 24 and supporting beam 32. Nut 48 has a central collar portion which is piloted in a bore in partition 24 and beam 32, for accurate location of the nut, and a radial flange portion which bears against partition 24 to accept the downward reactive thrust of screw shaft 47 resulting from the upward feeding of the confection body against knife body C.

Screw shaft 47 is tubular, with a partially closed lower end defining a squared opening 49. A squared drive shaft 50 projects upwardly through squared opening 49 into tubular shaft 47, for transmitting rotation thereto while allowing shaft 47 to climb upwardly in nut 48. The lower end of shaft 47 projects into chamber N. The upper portion of shaft 47 and turntable 33 are received in chamber O and adapted to move therein from a position of turntable 33 adjacent partition 24 to a position of turntable 33 adjacent the upper end of the housing.

The loading of the turntable with a fresh carton is accomplished when the turntable is in its upper limit position (just above the plane of spider 25) so that the operator may easily reach his fingers beneath the marginal portion of the turntable to operate lever 44. After it has been loaded it is manually rotated in a counterclockwise direction to its lowermost position, so that cover section A' may be attached to the machine. The machine is then ready for operation.

C. *Ice cream shaving unit.*—Shaving unit C (Figs. 1–4) embodies a sector shaped scoop 51 having an arcuate periphery 52 adapted to closely fit the lateral carton wall 39, having along one radial side a cutting edge 53 and having along its other radial side an upwardly extending side wall 54 which terminates in a horizontal flange 55. Blade 51 also has an integral, arcuate peripheral wall 56 extending upwardly from its arcuate periphery 52, beginning at the outer end of side wall member 55 and extending arcuately to a point approximately 90 degrees therefrom and there terminating in an outwardly turned scraping edge 57 as the end extremity of the wall 56. The upper extremity of peripheral wall member 56 is turned outwardly to provide a peripheral flange 58.

Scoop unit C is inset into a sector shaped opening 59 in top wall 27, and flange 55, 58 rest upon and are secured to top wall 27 along one side and the periphery of its opening 59, thereby to adequately withstand the downwardly prying action of the ice cream body against the blade 51 when the confection is being shaved.

With reference to the plane of the supporting flanges 55, 58 and top wall 27, blade 51 is formed with a helical flat thread shape, being inclined upwardly from its cutting edge 53 (at its lowermost extremity) to its corner 60, which is the level of flanges 55, 58. Side wall 54 and peripheral wall 56 are correspondingly of triangular shape. Cutting edge 53 is positioned substantially as a radius of carton 34. The inner corner of blade 51 and the adjacent end of side wall 54 are cut back at 61 to provide the blade with a sharp corner 61' substantially at the center of rotation.

The upward inclination of blade 51 is substantially greater than the angle of circumferential inclination of the shaved upper surface of confection body 48 (i. e. the pitch of blade 51 is substantially greater than that of screw 47). Actually, the blade pitch is preferably about twice the pitch of the cut taken in the confection body 48. Thus, if the total depth of the cut (pitch) in the confection body is 1 inch, which would produce a rise of roughly ⅜ inch in the upper surface level of the confection body, from cutting edge 53 around to side wall 54, then the total rise in blade 51 throughout its arcuate extent, would be roughly twice this value or ¾ inch. These figures are given merely by way of simple illustration, it being contemplated that the depth of cut will probably be about ¾ inch.

It will now be apparent that with the blade 51 rising at a much steeper angle than the cut upper surface of confection body 48, any tendency for the latter to adhere to and drag against the under side of blade 51 will be eliminated; and the power required for forcing a slab of ice cream upwardly over the blade 51 is correspondingly reduced to a minimum.

Forwardly of scraping edge 57, arcuate periphery 52 of blade 51 is unsupported except by a narrow scraping blade 62 having a sharpened forward edge bearing against the inner surface of carton lateral wall 39 for severing the periphery of the sliced slab 63 from the inner surface of the carton wall. Scraping edge 57 and blade 62 project somewhat beyond the normal radius of the inner surface of carton wall 39, whereby the carton wall is stretched outwardly in its area between blades 57 and 62, as indicated at 64. Beyond scraping edge 57, peripheral wall member 56 of blade 51 is interposed between the periphery of slab 63 and carton wall 39, in the area of the carton wall which is to be trimmed off, guiding this portion of the wall into the trimming unit D which will shortly be described.

An important function of severing blade 62 and scraping edge 57 is that of removing all confection material tending to cling to the carton wall, so as to substantially eliminate gumming up of the carton trimming knife, a condition with which considerable difficulty was experienced in the development of the invention. Also, trimming of the ribbon of carton material before it is set into the cut-off shear, improves the efficiency of operation of the latter.

The volume adjustment of our machine provides for regulating the angular degree through which the turntable is rotated in one cycle of operation, before the cut-off unit E is actuated to chop off and sever from the confection body the sector shape slab 63 which has resulted from feeding the body 48 circumferentially against cutting edge 53 and upwardly over blade 51. The maximum arcuate extent of the severed portion is somewhat less than the arcuate extent of blade 51. For ice cream cones, a slice of ice cream of from 15 to 30 degrees angular width, may be cut off. For dish servings, greater widths may be cut.

D. *Carton trimming unit.*—A ribbon of carton material 64 is severed from carton wall 39 by the carton trimming unit D (Figs. 1, 3, 4, 10, 11 and 12) which is disposed in a corner of the housing substantially 90 degrees removed from cutting edge 53 of slicing unit D. It utilizes a single cutter disc 65 having a bevelled cutting edge 66 at its upper face, said upper face being disposed in a plane inclined to correspond to the pitch (circumferential inclination) of the cut upper surface of confection body 48. Cutter disc 66 is attached to the upper end of a drive shaft 67 which is inclined a few degrees to one side of the vertical to provide the aforesaid pitch of the upper face of disc 65. The rimmed upper edge 68 of the carton (Fig. 4) is tangent to the plane of inclination of the upper face of disc 65 as indicated in Fig. 4. Ribbon 64 is severed by cutter disc 65, and is guided upwardly at an angle steeper than that of cut edge 68 and corresponding to the inclination of blade 51. This is provided for by a channel 69 in top wall 27 of cover section A', said channel being defined between spaced vertical, triangular shaped side members 70 (Fig. 8) and an inclined bottom web member 71, the former being spaced sufficiently close to closely embrace the ribbon 64 and the latter guiding the ribbon 64 upwardly at the proper angle to bring it above top wall 27 where it enters the cut-off unit E. Inner wall 70 is joined at 71 to peripheral wall 56 of blade unit C as indicated in Fig. 3.

Cutter shaft 67 is journalled, at its upper end, in a bearing bushing 72 carried on one end of an arm 73 the other end of which is provided by means of a trunnion 74 on a boss 75 mounted on the horizontal flange of spider 25. Arm 73 extends in a generally circumferential direction, whereby bushing 72 may swing in a generally radial direction (with reference to the axis of turntable 33) and thus swing cutter disc 65 radially. An inward limit of swinging movement is determined by a stop finger 76 projecting upwardly from the inner margin of spider 25, and outer limit of swinging movement is determined by bottoming of bushing 72 in a notch 77 in spider 25 (Figs. 4 and 6) in which bushing 72 is received.

The lower end of shaft 67 has a driving connection with gearing of actuator mechanism F, as will be described more in detail hereinafter, the shaft extending through appropriate openings (not shown) in partitions 24 and 23. The driving arrangement is such as to rotate cutter disc 65 in a counter clockwise direction, as viewed from above, at a peripheral speed approximately twice that of carton wall 39, whereby the cutter disc continuously tends to drag the carton wall forwardly as it cuts. This avoids any possibility of the carton wall being "piled up" against the cutter disc, i. e. being driven against the cutter disc faster than the latter tends to move the carton wall past it, so as to buckle against the cutter disc.

As will be apparent from the drawings, the cutter disc operates against the outer side of the carton wall 29. To assure the complete penetration and severing of the carton wall, the disc 65 is urged readily inwardly by forces derived from the tension in the carton wall. To this end, we provide a wedging finger 78, carried by a bracket 79 which in turn is secured to arm 73. Finger 78 has a lower shear edge 80 which engages the upper face of cutter disc 65, traversing the same in chordal relation to the cutting edge 66 of the disc, whereby the finger 78 will force carton wall 39 outwardly past cutting edge 66 as the carton wall travels past the cutter. It may be noted (Fig. 3) that where the carton wall meets the cutter 65, it is deflected outwardly beyond the normal periphery of the carton, and the tension thus set up in the carton wall, tending to draw it inwardly, exerts a radially inward pull against finger 78 for drawing the cutter disc 65 inwardly against the carton wall. Beyond the point where the ribbon 59 is severed from the carton wall 39, the ribbon will be deflected outwardly beyond the cut edge 68 of the carton wall. A guide finger 81, curved to conform roughly to the angle defined between finger 78 and bracket 79, cooperates with the latter to guide ribbon 64 into channel 69. Top wall 27 of cover section A has therein a slot 82 in which bracket 79 and finger 81 are received, finger 78 being offset below guide members 79 and 81, so that it may extend beneath top wall 27, as indicated in Fig. 1. Guide members 79 and 81 are secured to arm 73 in any suitable manner as by means of integral ears 83 thereon.

When a carton is being installed, arm 73 is swung outwardly to its outer limits of movement so as to move cutter disc 65 beyond the normal periphery of the carton. The carton may then be lowered into the machine. Finger 78 has, at its free end, a downwardly projecting hook 84 which slips into the carton as the top section of the machine is lowered onto the tubular housing member 21. Hook 84, riding against the inner surface of carton wall 39 of the rim thereof, draws the carton wall 39 outwardly against the cutter disc 65 to start the trimming operation.

The ribbon 64 of carton material which is trimmed away by the cutting operation passes between bracket 79 and finger 81 and is thereby guided into channel 69 (Fig. 3) in which it is guided upwardly to the cut off unit E.

Figure 13:
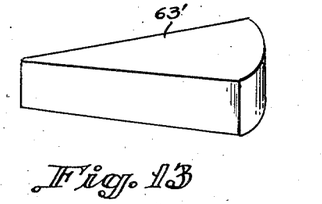
Fig. 13 is a perspective view of a severed slice of dispensed confection material.

E. *Cut-off unit.*—Cut-off unit E includes a blade 85 which extends diametrically and diagonally across the top of the machine, a confection severing knife 86 being carried by one end of the blade 85, and a ribbon severing guillotine knife 87 being carried by the other end of the blade 85. Knife 86 is of U-shape, having upwardly extending arms 88 which are secured as indicated to blade 85. Knife 86 includes a horizontal blade portion which is narrow so as to reduce to a minimum the adherence of confection thereto, and has a sharpened lower edge for cutting through the shaving 63 of confection material which has been shaved from the body of material in the carton and moved upwardly onto the upper face of shaving knife 51. Confection-severing knife 86 is disposed radially, substantially in alignment with the forward edge 58 of shaving knife 51, and as it cuts downwardly through the shaving 63, it cuts off a sector shape of serving of confection, as shown as 63' in Fig. 13. This cut-off operation constitutes the terminal stage of one cycle of operation of the machine, and is effected by a sharp downward thrust of blade 85. The discharge end of channel 70 is curved inwardly along a spiral path, to guide ribbon 64 through the guillotine unit now to be described, and into tray 28, by mechanism shortly to be described.

Ribbon severing guillotine mechanism comprises a knife 87 which, as shown, may be integral with blade 85. It operates with a shearing action in conjunction with a stationary guillotine anvil 89, which is disposed at an angle of approximately 20 degrees to the horizontal, and has integral guide fingers 90 and 91 projecting upwardly therefrom. Ribbon 64 is fed between guide fingers 90 and 91 and above anvil 89, the rear face of which is positioned in the same plane as the forward face of severing knife 87 so that shearing contact will be established between the two.

Figures 8, 9:
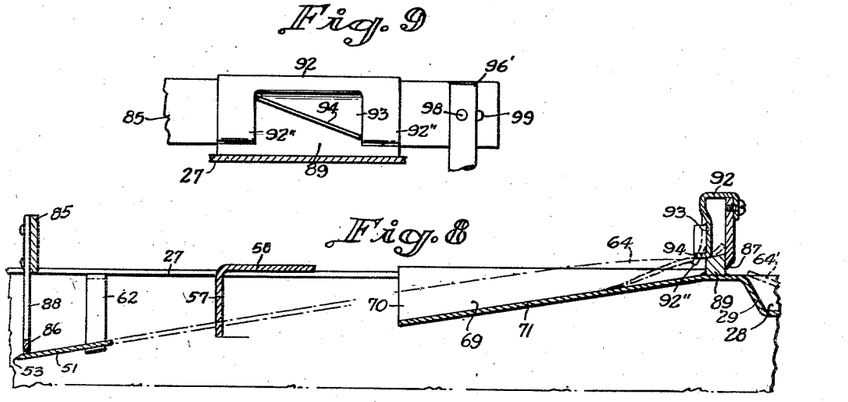
Fig. 8 is a detail vertical sectional view through the head portion of the machine taken on the line 8—8 of Fig. 1; (looking radially outwardly)
Fig. 9 is a detail of the carton ribbon cut off-shear.
Figure 10:
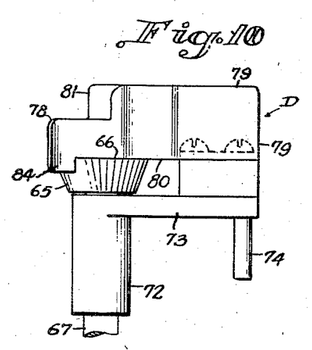
Fig. 10 is a detail side view of the carton trimmer.
Figure 11:
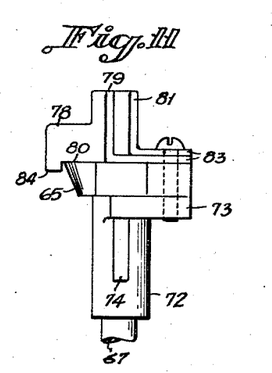
Fig. 11 is a detail end view of the carton trimmer.
Figure 12:
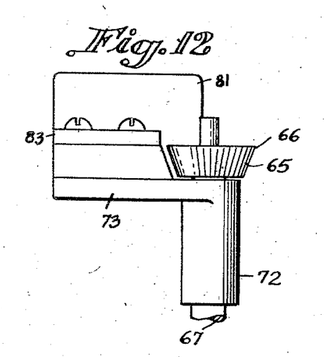
Fig. 12 is a detail of the opposite side of the carton trimmer.

The carton material being quite tough (paraffine impregnated cardboard) the problem of cleanly severing the ribbon 69 has proved to be somewhat difficult and to assure a clean cut, the blade 85 is provided with means for pressing knife 87 tightly against the anvil 89. Such means consists in a grapple 92, of spring sheet metal, channel shape in cross section, receiving the upper portion of the blade 85 in embracing relation, including a mounting flange 92' which is secured to the rear face of blade 85 (Fig. 4) and including pressure fingers 92" projecting downwardly in spaced relation to blade 85 so that the guide fingers 90, 91 may be received between fingers 92" and blade 85 and to yielding thrust knife 87 against anvil 89. The lower ends of pressure fingers 92" are flared away from the blade 85 to guide them over the upper ends of fingers 90, 91 as they initially make contact therewith. Between fingers 92", the grapple 92 has a web member 93 the lower edge of which is turned outwardly to provide a pressure lip 94 for engagement against the beveled upper face of anvil 89 as shown in Fig. 8. The function of lip 94 is to clamp the ribbon 69 against fixed blade 89 while knife 87 is shearing the ribbon, thus preventing the ribbon from pulling between knife 87 and blade 89.

As each serving 63' of confection material is cut by knife 86, a portion of ribbon 64' (Fig. 8), having a length corresponding to the arcuate width of the wide end of serving 63', will be severed by knife 87 and manually removed.

Blade 85 is actuated with a spring-loaded downwardly chopping action, by means of loading springs 95, 95', loaded under compression so as to act downwardly against pull rods 96, 96', the upper ends of which are connected to the respective ends of blade 85 by means of a pivot 97 at one end and a pin 98 which has a combined sliding and pivotal action in a slot 99 in the other end of the blade. The respective ends of blade 85 are received in slots in pull rods 96, 96', and are snugly embraced by the furcations defined in respective sides of these slots, so that the blade 85 is securely held in the vertical plane in which it operates.

Pull rods 96, 96' are slidably mounted in bushings 100 (which are secured in respective openings in top panel 27 by nuts 101 threaded thereon) and in grommets 102 mounted in the partition 24; and springs 95 are loaded under compression between the lower ends of nuts 101 and washers 103 which are suitably fixed on rods 96, 96'. Thus the springs 95, 95' constantly urged the pull rods 96, 96' downwardly so that, when the pull rods are released for downward movement, blade 85 will descend with a chopping action. This chopping action is one in which confection severing blade 86 descends ahead of guillotine knife 87, severs a confection portion 63' from shaving 63, and comes to rest against blade 51 prior to the engagement of ribbon 69 by knife 87. The action of knife 87 thus becomes a sharp chopping action which obtains the utmost efficiency in severing the ribbon.

The chopping action just described is brought about by releasing the rods 96, 96' in rotation in the order named.

For elevating knife 85 and loading the springs 95, 95' the lower ends of rods 96, 96' are engaged by heads 104 on the upper ends of push rods 196, 196', the heads 104 being received and piloted in recesses in the undersides of washers 103. Push rods 196, 196' are projected downwardly into chamber M and are provided with respective pistons 105, 105', which operate vertically in hydraulic cylinders 106, 106' in which they are sealed by piston rings 107. Cylinders 106 are mounted in openings in pan cover 23 and extend downwardly into hydraulic chamber M. Power for raising knife 85 and loading springs 95, 95' is provided by hydraulic fluid contained in oil reservoir M and pumped into cylinders 106 by the actuator mechanism F.

Figure 14:
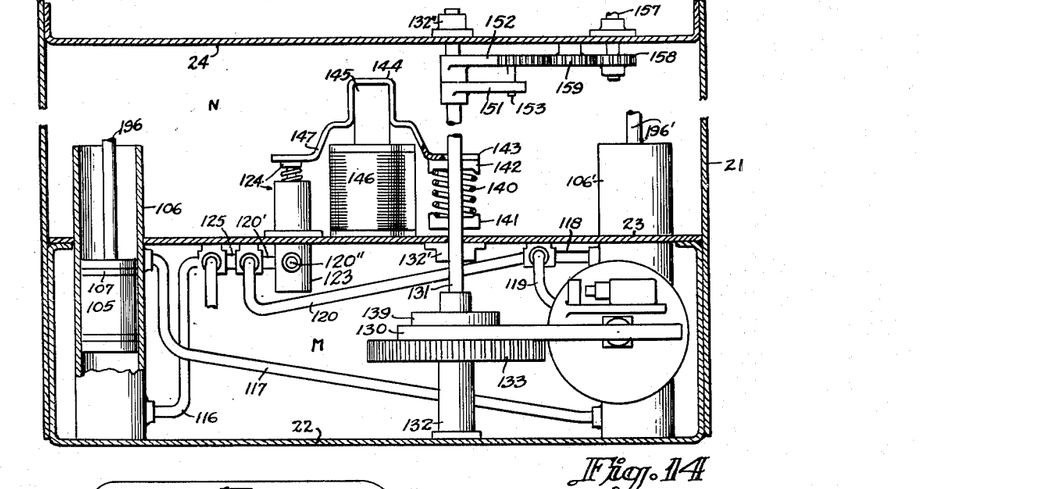
Fig. 14 is a detail vertical sectional view of the lower portion of the machine.

F. *Actuator mechanism—hydraulic circuit.*—Actuator mechanism F (Figs. 14, 15) includes a hydraulic pump 110, driven by an electric motor 111, drawing hydraulic fluid from reservoir M through a filter 112 and a suction line 113 and discharging it through a pressure line 114 into a fluid line 115 which has a branch 116 for delivering the fluid under pressure to the lower end of cylinder 106. At a higher level, a transfer line 117 leads from cylinder 106 to cylinder 106', where it connects to the lower end thereof (Fig. 14a). From a higher level, a fluid line 118 leads from cylinder 106' to a pair of branch lines 119 and 120. Line 119 connects to the closed end of a cylinder 121 of a hydraulic servomotor 122. Line 120 is a return line leading to a connection 120' to the cylinder 123 of a piston valve 124. Valve 124 controls an escape port 120" for return of fluid to reservoir M. A branch return line 125 leads from line 116 to return line 120', making a T-connection with lines 120 and 120'.

Piston 105 is at a height such that in the lowered position of blade 85, connecting line 117 will just clear the upper end of the piston (Fig. 14) whereas in the raised position of blade 85, branch line 117 will just clear the lower end of piston 105. Piston 105' has a similar relation to outlet line 118 (Fig. 14).

Briefly explaining the hydraulic circuit above described, the arrangement is such that at the beginning of the power operation the blade 85 will be lifted to clear the confection severing knife 86 and guillotine knife 87 from the path of the confection shaving 63 and ribbon 69 respectively, and the servomotor 122 will then be actuated to set in motion a train of gearing (to be described hereinafter) for rotating the turntable 33 a predetermined amount; the valve 124 then being actuated to open the outlet end of return line 120, 120' and permit the pressure fluid to escape back into reservoir M in a pattern such that the knife 86 will be lowered first, while the knife 87 remains elevated, and finally the knife 87 will descend with the above mentioned chopping action. This is accomplished as follows:

As the pump 110 is actuated to drive pressure fluid through pressure line 114 and manifold 115 into the inlet line 116 of knife elevating cylinder 106, the piston 105 will be driven upwardly, elevating knife 86, until the lower end of piston 105 clears transfer line 117. Thereupon the fluid under pressure will pass through transfer line 117 into the lower end of cylinder 106', raising piston 105', so as to elevate knife 87. The parts are now in position shown in Fig. 4, and the lower end of piston 105' has cleared the outlet 118 of cylinder 106'. Through line 118, the pressure fluid will now flow into servomotor 122, to advance the turntable. The above-described power flow of fluid is indicated by the full line arrows in Fig. 15. When the servomotor 122 has made the full stroke for which it is set, control mechanism (hereinafter to be described) will be actuated to open valve 124 releasing the pressure in the return line 120. Piston 105' will drop back slightly until it closes outlet line 118, and will be arrested at that point. Simultaneously, pressure fluid will escape from servomotor 122 through return line 120 and pressure will escape from cylinder 106 through line 116 and branch outlet line 125. This escape flow of fluid is indicated by the dotted arrows. As the fluid commences to flow out of cylinder 106, the piston 105 will start to descend, closing off connecting line 117 so as to seal the fluid under pressure in cylinder 106' and thus hold guillotine knife 87 in its raised position, until piston 105 has completed its descent to its lowered position shown in Fig. 14, in which position return line 117 is uncovered over the top of piston 105, allowing the pressure fluid from cylinder 106' to escape back through connecting line 117 and through the open upper end of cylinder 106. This will allow the guillotine knife 87 to be snapped downwardly under the pull of coil spring 95', for severing the ribbon 69.

*Actuator mechanism—turntable and cutter drive mechanism*

Servomotor 122 includes a piston 126 operating in cylinder 121 under the opposing forces of fluid pressure in the closed end of cylinder 121 and a coil spring 127 under compression in the other end of the cylinder and acting directly against the piston. A connecting rod 128 is pivoted at one end to piston 126 and at its other end, at 129, is pivoted to a lever 130. Lever 130 is freely pivoted on a shaft 131 which is journalled in bearings 132, 132' and 132" mounted on bottom 22 and partitions 23 and 24 respectively. Freely rotatable on shaft 131, directly below lever 130 and resting on bearing 132, is a spur gear 133 which meshes with a train of gears (Fig. 15) including an idler 134, a gear 135 which is secured to turntable drive shaft 50, and a train of idler gears 136 terminating with a pinion 137 on the lower end of cutter drive shaft 67.

Servomotor 122 provides a jacking-drive, operating as follows: As the hydraulic fluid enters servomotor 122 and advances piston 126, compressing spring 127, lever 130 will be swung clockwise as viewed in Fig. 15 and turntable drive shaft 50 will likewise be rotated clockwise.

At the same time, carton trimming cutter disc 65 will be rotated clockwise but at a higher rate of speed owing to the speed increasing ratio of the gears 136.

Drive is transmitter from lever 130 to gear 133 as follows: Secured to shaft 131, immediately above lever 130, and resting thereon, is a clutch disc 139. Shaft 131 has end play in bearings 132—132" so as to allow downward pressure to be applied by clutch disc 139 to lever 130. Such pressure is applied through a coil spring 140, resting upon a collar 141 which is secured to shaft 131, and engaged at its upper end by a collar 142 freely slidable on shaft 131. Collar 142 is engaged by a fork 143 on one end of a yoke 144 which is secured to the upper end of an armature 145 of a solenoid 146, mounted on partition 23. The opposite arm 147 of yoke 144 bears against piston valve 124 for actuating the same against the yielding resistance of a return spring 148.

At this point, it may be noted that, at the beginning of a cycle of operation, solenoid 146 is actuated to draw armature 145 downwardly, compressing spring 140 and placing the spring load thereof against clutch disc 139 which presses lever 130 into frictional clutching engagement with gear 133. Simultaneously, valve piston 124 is moved downwardly to close off the escape port 120" of valve 123, 124, thus closing the circuit for the power actuation of knife elevating unit 105, 106, 105', 106' and servomotor 122. The ensuing power stroke, in which fluid is pumped under pressure through the hydraulic circuit as described above, is initiated by the same impulse which energizes relay 146, and utilizes the clutching drive which is established as just described, in order to transmit rotation to gear 133.

*Stroke adjusting mechanism*

As previously indicated, the invention provides for adjusting the mechanism so that servings of several different sizes can be dispensed from the machine. This is provided for by adjusting the length of the effective stroke of servomotor 122, by arresting the operation of pump 110 at selected points in the operational cycle. The control mechanism for doing this is electrical, and includes a limit switch or timing switch 150 of the push button type, normally closed and adapted to be opened when engaged by a switch actuator finger 151 secured to shaft 131. The length of stroke is dependent upon the starting position of finger 151. This position is determined by the setting of a gear segment 152 which carries a stop pin 153 projecting downwardly into the path of retractive swinging movement of finger 151 under the urge of a stretched coil spring 154 which is suitably anchored at one end, as by means of a bracket 155 attached to partition 24 and has its other end attached to finger 151. The more finger 151 is retracted, the greater will be its arc of travel before engaging timing switch 150 and consequently the longer will be the stroke of the machine. Spring 154 tends to draw finger 151 to its position of maximum retraction, maintaining it constantly in engagement with stop pin 153 (except when lever 130 is being advanced in the power stroke). At this time, clutch disc 139, being frictionally engaged against lever 130, will cause shaft 131 to rotate with lever 130 and thus finger 151 will be moved away from stop pin 153, stretching spring 154, until it engages timing switch 150 to terminate the cycle of operation.

The position of gear sector 152, which determines the starting position of finger 151, is set by adjusting a dial knob 156 on the upper end of a setting shaft 157, thereby rotating the latter and transmitting rotation through a pinion 158 secured to its lower end and through an idler pinion 159 to the sector 152 which meshes with idler 159.

*Electrical circuit—control mechanism*

The electrical system for energizing and controlling motor 111 and 126 includes a starting switch 160, which may be of the push button type, being manually operable for starting a cycle of operation; a normally open cycling switch 161; a bell crank 162 having an arm to engage cycling switch 161 for closing the same and having a second arm adapted to be engaged by an actuator pin 163 (projecting upwardly from lever 130) when piston 126 has returned to its starting position, thus resetting the circuit for a new cycle of operation; and a double pole relay 164 which controls the main circuit.

The control mechanism also includes a double pole relay 164 having a set of contacts 165 for closing the operating circuits and having a set of contacts 166 for closing a holding circuit in the relay, so that push button 160 can be released, once a cycle of operation has been started, without arresting such cycle.

From a service connection to a suitable source of current, indicated at 110V, a service cord including conductors 167, 168 extends into the machine. From conductor 167, a conductor 169, 170 extends to one side of push button switch 160. From the other side of push button switch 160 a conductor 171 extends to one side of cycling switch 161. From the other side of switch 161 a conductor 172 extends to relay 164, where it is connected in parallel to one side of the energizing coil of this relay and to contact 166. From the other side of the energizing coil of relay 164, a conductor 173 connects to the other service line 168. It may now be noted that by pressing push button switch 160, a series circuit through switches 160 and 161 from current source 110V to the energizing coil of relay 164 is established, switch 161 being closed by the retraction of lever 130 at the end of a previous cycle of operation. When relay 164 closes, contacts 165, 166 close, and the holding circuit in relay 164 is set up so as to maintain the relay closed until the holding circuit is broken. The holding circuit includes conductor 173 extending from the service lines 168 to one side of the relay energizing coil, the connection 172' from the other side of the relay energizing coil to one of the contacts 166, a conductor 174 extending from the other contact 166 to one side of timing switch 150, and a conductor 175 extending from the other side of the timing switch 150 to the other service line 167.

It will now be apparent that the timing switch 150 functions to establish an energizing holding circuit for relay 164 which is in parallel with the initial energizing circuit set up by the closing of push button 160, and that this holding circuit will remain closed, thus maintaining the relay 164 energized, up to the point where timing switch is opened, regardless of whether the push button switch 160 is held closed or is released.

The primary function of cycling switch 161 is to assure the return of servomotor piston 126 and lever 130 to the starting position before a new cycle of operation can be initiated. To this end, switch 161 is in series with starting switch 160, and is opened (thus opening the starting circuit) when servomotor piston 126 has moved a short distance under the pressure of fluid entering the cylinder 121 in the early stage of a cycle of operation, and does not reclose until the cycle of operation has been completed.

It should be noted that it is essential that the lever 130 return to a starting position before a new cycle of operation can be commenced, since the volume of a serving is measured by the extent of movement of lever 130 from its starting position.

Should the operator have his finger on starting button 160 at the time one cycle of operation is completed, a new cycle of operation will be immediately commenced by the closing of cycling switch 161 at the end of the previous cycle.

The closing of relay contacts 165 is operative to set up parallel energizing circuits to motor 111 and solenoid 146. One contact of relay switch 165 is connected by a common conductor 176 to branch conductors 177, 178 leading respectively to one side of motor 111 and to one side of solenoid 146. The other contact of relay switch 165 is connected, by a conductor 179, to one of the service leads 168. The other sides of motor 111 and solenoid 146 are connected by connectors 180, 181, respectively to conductors 169, 175 respectively and thence to the other service lead 167, thus completing the energizing circuits, in parallel, to motor 111 and solenoid 146. Each of these circuits is completed when relay switch 165 is closed and is opened when relay switch 165 is opened. Thus the motor 111 and solenoid 146 are energized and deenergized simultaneously.

OPERATION

The operation of the apparatus will be largely apparent from the foregoing description, but will be reviewed briefly at this point.

When a serving of ice cream is to be dispensed, the operator "dials" the size of the serving that is ordered by rotating dial 156 to bring the selected one of the indicator marks thereon opposite an indicator mark 182 on a stationary dial below knob 156. Through gears 158 and 159, rotation of dial shaft 157 will be transmitted to sector 152, positioning stop pin 153 at the proper point to determine the starting position of setting finger 151 on shaft 131, finger 151 being caused to follow stop pin 153 and remain in contact therewith, by the pull of spring 154.

During the setting of finger 151, shaft 131 will rotate free from the lever 130, owing to the fact that solenoid 146 is deenergized and no pressure is being exerted against the clutch disc 139.

Having thus set the machine, the operator then presses starting button 160, causing relay 164 to close, closing relay switch 166 for setting up a holding circuit through timing switch 150 to maintain the relay closed after starting button 160 is released, timing switch 150 being a normally closed switch and finger 151 being withdrawn away from it, the holding circuit will immediately be set up when push button 160 is depressed, and will continue until a cycle of operation has been completed to bring finger 151 against timing switch 150 to open the same.

The energizing of relay 164 also closes switch 166 which establishes parallel circuits to pump motor 111 and solenoid 146. Thus the operation of pump 110 is started, and simultaneously, pressure release valve 124 is closed so as to hold the pressure in the fluid circuit, whereby the fluid pumped by pump 110 through pressure line 114 will be routed through lines 115 and 116 to cylinder 106, causing the piston 105 to be elevated until its lower end clears transfer line 117 (with a corresponding elevation of one end of knife 85) whereupon the pressure fluid will be routed to the second cylinder 106' causing the piston 105' to be elevated, elevating the other end of the blade 85, until the lower end of piston 105' clears outlet line 118, whereupon the fluid pressure will be routed through lines 118 and 119 to servomotor 122, commencing the operation of the latter to rotate the turntable 33. At this point it may be noted that the turntable commences rotating only after the knives 86 and 87 have been fully elevated to clear the paths of movement of the cream slice 63 and the carton ribbon 64.

The energizing of solenoid 146 causes its armature 146 to be drawn downwardly, closing valve 124 and pressing clutch disc 139 into clutching engagement with lever 130 and lever 130 into clutching engagement with gear 133, whereby, upon actuation of servomotor 122, lever 130 will transmit rotation both to gear 133 and to shaft 131 so as to transmit drive to the turntable and to timing switch actuating finger 151.

As piston 126 of servomotor 122 advances, transmitting movement through connecting rod 128 to lever 130, rotation will be transmitted from lever 130 to turntable 33 through gearing 133—135, through drive shaft 50 and screw shaft 47, whereupon turntable 33 will simultaneously rotate and advance upwardly at the rate determined by the pitch of threads 47, moving the body of ice cream in the carton 34, 39 against shaving knife 51 and causing a shaving 63 to be moved upwardly in a circular path, upon shaving knife 51. Simultaneously, the wall 39 of the carton will be advanced against trimming knife 65, which is being rotated through gearing 136, and a ribbon of carton material 69 will be advanced upwardly through guide channel 70 and between guide fingers 90, 91 of guillotine anvil 89, to a point above tray 28. Simultaneously, rotation will be transmitted through shaft 131 to finger 151 which will move toward timing switch 150, connecting the latter at the end of the stroke which has been pre-determined by the setting of dial knob 156. The distance of movement of finger 151 from its starting position determined by the setting of stop pin 153 and the position where it contacts switch 150, determines the size of the shaving which is moved up onto shaving knife 51, and thus determines the size of the serving.

When finger 151 contacts timing switch 150, the energizing circuit of solenoid 164 will be broken and solenoid switches 165 and 166 will open, thus deenergizing the motor 111 and the solenoid 146. Thereupon, the pumping of fluid will cease, the pressure in the fluid circuit will be released through escape port 120" by the opening of valve 124, and the movement of servomotor 122 will terminate. The fluid will then be expelled from the fluid line by the consecutive action of springs 95, 95' and 127 (servomotor spring). Initial escape path is from cylinder 106 through lines 116, 125 and 120', allowing piston 105 to descend until its upper end clears transfer line 117, thereby opening up a secondary escape path for the release of fluid from cylinder 106' through line 117, and through the open upper end of cylinder 106. The release of fluid from cylinder 106 allows knife 86 to descend under the pull of spring 95, severing the measured portion of shaving 63 to provide a serving portion which may be lifted from knife 51 by a spatula or other instrument, for serving to a customer. At the same time, knife 87 will rapidly descend with a chopping movement, under the pull of spring 95' which severs ribbon 69 against anvil 89 and drops the severed portion into tray 28. Simultaneously with the release of fluid from cylinder 106, the path for return flow of fluid from servomotor 122 through lines 119, 120, 120' to escape orifice 120" will be opened, and fluid will be expelled from servomotor 122 as soon as the pressure in the line drops to a level low enough to allow spring 127 to become operative to expel fluid from cylinder 120, 121. The loading of springs 95, 95' is, however, of a higher value than that of spring 127, and thus the servomotor will not return to the starting position until the high pressure developed by springs 95, 95' has been released. The return of the servomotor accordingly follows the return of pistons 105 and 105'.

When the servomotor piston 126 is returned to its starting position, pin 163 will contact bell crank 162 to reclose switch 161, thus setting up the starting circuit for actuation when push button 160 is again closed.

I claim:

1. Apparatus for dispensing frozen confections and like materials, comprising: a housing including a body section of generally square cross-section, open at its upper end, and a cover section, and means for detachably anchoring said cover section to said body section in closing relation to said open upper end; a scoop carried by said cover section, said scoop having a shaving edge; means for supporting a carton of the frozen material within said housing, for rotating the same, and for feeding it upwardly against said scoop to cause a ribbon of the material to be shaved therefrom by said edge; a cut-off knife for severing said ribbon into serving portions; mounting means for said knife, extending between diagonally opposed corners of said cover section; a pair of vertical operating links, attached to respective ends of said knife mounting means, slidably mounted in said cover section and extending downwardly therethrough; springs engaged under compression between said links and said cover section and operative to move said knife for downward cut-off movement; and power actuated means in said housing, including pushers extending upwardly for abutting engagement with the lower ends of said links, to raise the knife and load said springs, said power actuated means being adapted for sudden release of said pushers to permit said knife to move rapidly downwardly with a chopping stroke under the action of the loaded springs, said links being adapted to be lifted away from said pushers to permit ready removal of said cover section.

2. Apparatus for dispensing frozen confections and like materials, comprising: a housing including a tubular body section, open at its upper end, a cover section, and means for releasably anchoring said cover section to said body section, in closing relation to said open upper end; a scoop carried by said cover section; means for supporting a carton containing a body of the frozen material within said housing, for feeding it upwardly against said scoop, and for rotating it so as to cause a ribbon of the material to be shaved therefrom by the scoop; a cut-off knife for severing said ribbon into serving portions; a pair of links connected to said knife and extending downwardly through the cover section; springs engaged under compression between said cover section and said links and operative to urge the knife downwardly for cut-off operation; and power actuated means in said housing, including pushers extending upwardly for abutting engagement with the lower ends of said links, to raise the knife and load said springs, said power actuated means being adapted for sudden release of said pushers to permit said knife to move rapidly downwardly with a chopping stroke under the action of the loaded springs, said links being adapted to be lifted away from said pushers to permit ready removal of said cover section.

3. Apparatus for dispensing frozen confections and like materials, comprising: a housing including a tubular body section, open at one end, and a removable cover section normally closing said open end; a scoop carried by said cover section; means for supporting a carton containing a body of the frozen material within said housing, for feeding it against said scoop, and for rotating it so as to cause material to be shaved from said body by said scoop; and means for trimming away the wall of said carton in step with the removal of material therefrom, said trimming means comprising a rotatable trimming disc for engaging the carton wall externally, a shaft carrying said disc and extending longitudinally within the housing body, and means remote from the open end of the housing for transmitting rotation to the shaft, said shaft being mounted for limited swinging movement at the end thereof carrying said disc, so as to accommodate shifting of the disc generally radially of the major axis of the housing, between an operative position wherein the periphery of the disc intersects the periphery of the carton, and a position wherein the disc entirely clears the periphery of the carton.

4. Apparatus as defined in claim 3, including an arm having a bearing in which the swinging end of said shaft is journalled; and a pivot connecting said arm to the housing in a position extending generally tangentially with reference to the periphery of the carton, with the arm projecting from said pivot in a direction facing the approaching carton wall during rotation thereof, and with the pivot disposed radially outwardly of the carton periphery, whereby the resistance of the carton wall to the trimming action of said disc will set up a resultant force urging said disc inwardly into intersecting relation to the carton wall.

5. Apparatus for dispensing frozen confections and like materials, comprising: a housing including a tubular body section, open at one end, and a removable cover normally closing said open end; a scoop carried by said cover section; means for supporting a carton containing a body of the frozen material within said housing, for feeding it against said scoop, and for rotating it so as to cause material to be shaved from said body by said scoop; and means for trimming away the wall of said carton in step with the removal of material therefrom, said trimming means comprising a rotatable trimming disc for engaging the carton wall externally, and a pair of guide fingers extending in generally tangential relation to said disc and to the carton periphery, said fingers being spaced radially of the carton periphery and adapted to engage respective inner and outer sides of a ribbon of material trimmed away from the carton wall and to guide said ribbon away from the periphery of the carton wall.

6. Apparatus as defined in claim 5, wherein the inner guide finger has a portion located to engage the inner wall of the carton wall ahead of the point where the carton wall is severed by the disc, and to guide the carton wall against the disc.

7. Apparatus as defined in claim 5, wherein the space between said guide fingers terminates in a discharge gap at the rear ends thereof; and including a guide channel formed in said cover, said channel having an open receiving end registering with said discharge gap, and having a bottom which is inclined from maximum depth at said receiving end to merging relation to the face of said cover, at a point remote from said receiving end, said channel functioning to guide the ribbon of severed carton material beyond the confines of said housing.

8. Apparatus for dispensing frozen confections and like materials, comprising: a housing including a tubular body section, open at one end, and a removable cover section normally closing said open end; a scoop carried by said cover section; means for supporting a carton containing a body of the frozen material within said housing, for feeding it against said scoop, and for rotating it so as to cause material to be shaved from said body by said scoop; means for slitting the wall of the carton on a helical path, thus trimming off a ribbon of the carton wall material; and means for severing said ribbon into separate fragments.

9. Apparatus for dispensing frozen confections and like materials, comprising: a housing including a tubular body section, open at one end, and a removable cover section normally closing said open end; a scoop carried by said cover section; means for supporting a carton containing a body of the frozen material within said housing, for advancing it against said scoop, and for rotating it so as to cause frozen material in the form of a ribbon to be shaved from said body by said scoop; a carton trimmer carried by said cover section and operable to sever the carton wall along a helical path as the result of the feeding and rotating movement of said carton, whereby to separate from the carton wall a strip of the wall material; a guillotine blade for chopping said strip into sections; a cut-off knife for severing said ribbon of frozen material into serving portions; a bar to which said cut-off knife and guillotine blade are secured; a pair of links connected to the respective ends of said bar and extending downwardly through the cover section; springs engaged under compression between said cover section and said links and operative to urge the bar downwardly for cut-off operation; and power actuated means in said housing, including pushers extending upwardly for abutting engagement with the lower ends of said links, to raise the bar and load said springs, said power actuated means being adapted for sudden release of said pushers to permit said bar to move rapidly downwardly with a chopping stroke under the action of the loaded springs, said links being adapted to be lifted away from said pushers to permit ready removal of said cover section.

10. Apparatus for dispensing frozen confections and like materials, comprising: a housing including a tubular body section, open at one end, and a removable cover section normally closing said open end; a scoop carried by said cover section; means for supporting a carton containing a body of the frozen material within said housing, for advancing it against said scoop, and for rotating it so as to cause material to be shaved from said body by said scoop; and means for trimming away the wall of said carton in step with the removal of material therefrom, said trimming means comprising a rotatable trimming disc positioned for engaging the carton wall externally in intersecting relation thereto; and means for rotating said disc in a direction such that its cutting edge, where it intersects the carton wall, moves in the same direction as the carton wall but a circumferential speed faster than that of the carton wall.

11. Apparatus as defined in claim 10, including an arm having a swinging end on which said disc is journalled; and a pivot connecting said arm to the housing in a position extending generally tangentially with reference to the periphery of the carton, the arm projecting from said pivot in a direction facing the approaching carton wall during rotation thereof, with the pivot disposed radially outwardly of the carton periphery, whereby the resistance of the carton wall to the trimming action of said disc will set up a resultant force urging said disc inwardly into intersecting relation to the carton wall.

12. Apparatus as defined in claim 10, wherein said disc-rotating means comprises power operated means geared to both said disc and said carton supporting and rotating means, for actuating them in timed relation, one to the other.

13. Apparatus for dispensing frozen confections and like materials, comprising: a housing including a tubular body section, open at one end, and a removable cover section normally closing said open end; a scoop carried by said cover section; means for supporting a carton containing a body of the frozen material within said housing, for advancing it against said scoop, and for rotating it so as to cause frozen material in the form of a ribbon to be shaved from said body by said scoop; a carton trimmer carried by said cover section and operable to sever the carton wall along a helical path during the advancing and rotating movement of said carton, whereby to separate from the carton wall a strip of the wall material; a guillotine blade for chopping said strip into sections; a cut-off knife for severing said ribbon of frozen material into serving portions; a guide channel in said cover, for guiding said strip in a generally helical path from a point within the housing to a point external of the housing; and means for simultaneously actuating said cut-off knife and guillotine blade at the end of a cycle of operation of the carton rotating and advancing means, to effect said chopping and severing actions.

14. Apparatus for dispensing frozen confections and like materials, comprising: a housing including a tubular body section, open at one end, and a removable cover section normally closing said open end; a scoop carried by said cover section; means for supporting a carton containing a body of the frozen material within said housing, for advancing it against said scoop, and for rotating it so as to cause a ribbon of frozen material to be shaved from said body by said scoop; a cut-off knife for severing said ribbon of frozen material into serving portions; a carton trimmer carried by said cover section and operable to sever the carton wall along a helical path during the advancing and rotating movement of said carton, whereby to separate from the carton wall a strip of the wall material; a guide channel in said cover, for guiding said strip in a generally helical path from a point within the housing to a point external of the housing; and means for sequentially actuating said carton rotating and advancing means and said cut-off knife whereby to effect the cut-off operation automatically at the end of the carton movement.

15. Apparatus as defined in claim 14, including means to vary the timing of the cut-off operation for different arcuate lengths of rotating movement of the carton, for dispensing selected serving portions of varying sizes.

16. Apparatus for dispensing frozen confections and like materials, comprising: a housing including a tubular body section, open at one end, and a removable cover section normally closing said open end; a scoop carried by said cover section; means for supporting a carton containing a body of the frozen material within said housing, for feeding it against said scoop, and for rotating it so as to cause material to be shaved from said body by said scoop; means for slitting the wall of the carton on a helical path, thus trimming off a strip of the carton wall material; a guide channel in said cover for guiding said strip in a generally helical path from the trimming point within the housing to a point external of the housing; and means for collecting the strip externally of the housing.

17. Apparatus for dispensing frozen confections and like materials, comprising: a housing including a tubular body section, open at its upper end, a cover section, and means for releasably anchoring said cover section to said body section, in closing relation to said open upper end; a scoop carried by said cover section; means for supporting a carton containing a body of the frozen material within said housing, for feeding it upwardly against said scoop, and for rotating it so as to cause a ribbon of the material to be shaved therefrom by the scoop; a cut-off knife for severing said ribbon into serving portions; a pair of links connected to said knife and extending downwardly through the cover section; springs engaged under compression between said cover section and said links and operative to urge the knife downwardly for cut-off operation; and power actuated means in said housing, including pushers extending upwardly for abutting engagement with the lower ends of said links, to raise the knife and load said springs, said power actuated means being adapted for sudden release of said pushers to permit said knife to move rapidly downwardly with a chopping stroke under the action of the loaded springs, said links being adapted to be lifted away from said pushers to permit ready removal of said cover section, said power actuated means comprising a pair of hydraulic servomotors for actuating said pushers to overcome said springs; a pump for loading said servomotors; and a release valve for unloading said servomotors to render said springs operative.

18. Apparatus for dispensing frozen confections and like materials, comprising: a housing including a tubular body section, open at its upper end, a cover section, and means for releasably anchoring said cover section to said body section, in closing relation to said open upper end; a scoop carried by said cover section; means for supporting a carton containing a body of the frozen material within said housing, for feeding it upwardly against said scoop, and for rotating it so as to cause a ribbon of the material to be shaved therefrom by the scoop; a cut-off knife for severing said ribbon into serving portions; a pair of links connected to said knife and extending downwardly through the cover section; springs engaged under compression between said cover section and said links and operative to urge the knife downwardly for cut-off operation; and power actuated means in said housing, including pushers extending upwardly for abutting engagement with the lower ends of said links, to raise the knife and load said springs, said power actuated means being adapted for sudden release of said pushers to permit said knife to move rapidly downwardly with a chopping stroke under the action of the loaded springs, said links being adapted to be lifted away from said pushers to permit ready removal of said cover section; said power actuated means comprising a pump; a pair of hydraulic servomotors for actuating said pushers to overcome said springs; a hydraulic device, operated by said pump, for transmitting rotating movement to said carton supporting and rotating means; control mechanism to control the length of stroke of said hydraulic device for controlling the size of a dispensed serving; and means for setting the control mechanism for varying operations.

19. Apparatus as defined in claim 18, wherein said hydraulic device comprises a cylinder, a piston and a piston rod; and including a swinging lever actuated by said piston rod, a gear train having ratcheting connection with said swinging lever and in drive transmitting relation to said carton supporting and rotating means, a limit switch for terminating the operation of said pump, and means actuated by said swinging arm for actuating said limit switch.

References Cited in the file of this patent

UNITED STATES PATENTS 2,534,782  Maddux _______________ Dec. 19, 1950